Nov. 24, 1964    R. S. WEBB    3,158,728
HIGH VOLTAGE-REVERSE POLARITY EDM
Filed July 26, 1960    5 Sheets-Sheet 2
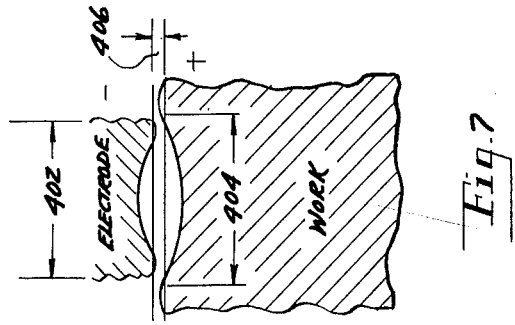
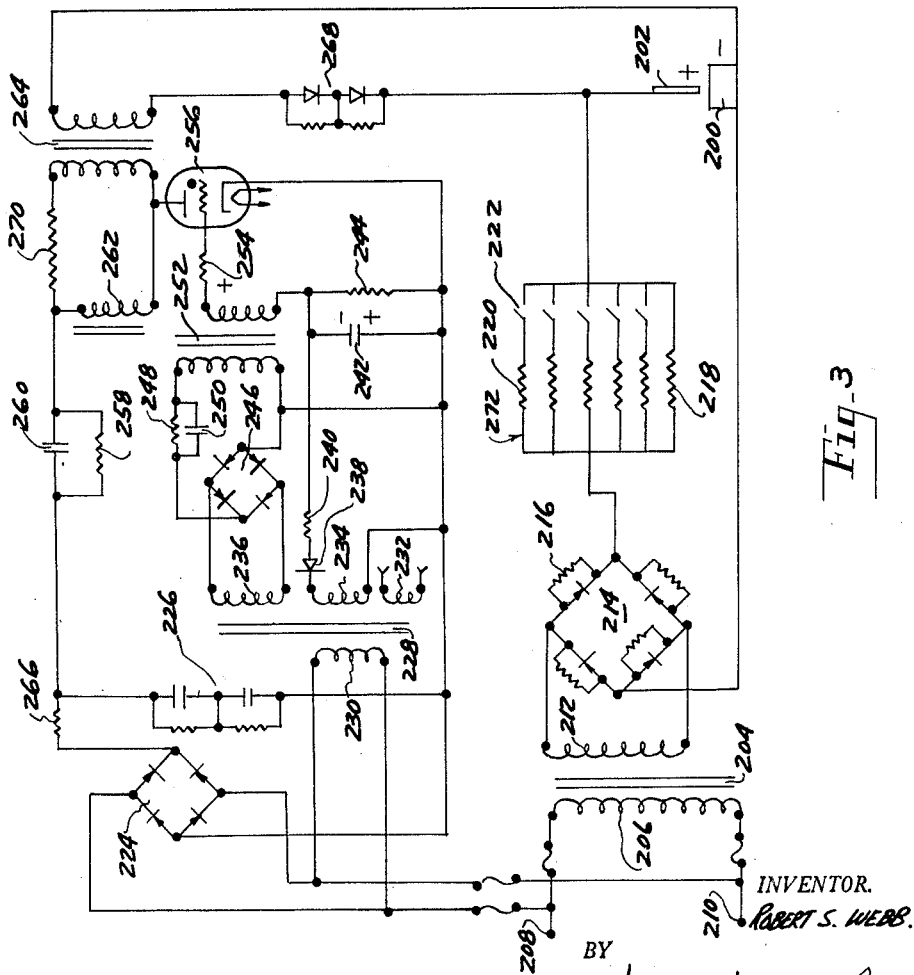
INVENTOR.
Robert S. Webb.
BY
M. K. Murphy
ATTORNEY INVENTOR.
ROBERT S. WEBB
BY
M K Murphy
ATTORNEY Nov. 24, 1964  R. S. WEBB  3,158,728
HIGH VOLTAGE-REVERSE POLARITY EDM
Filed July 26, 1960  5 Sheets-Sheet 4
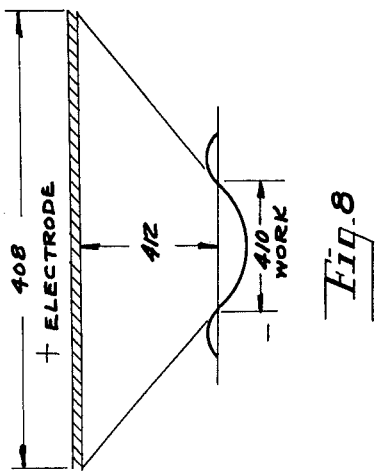
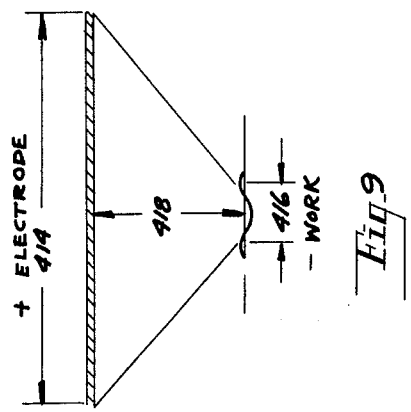
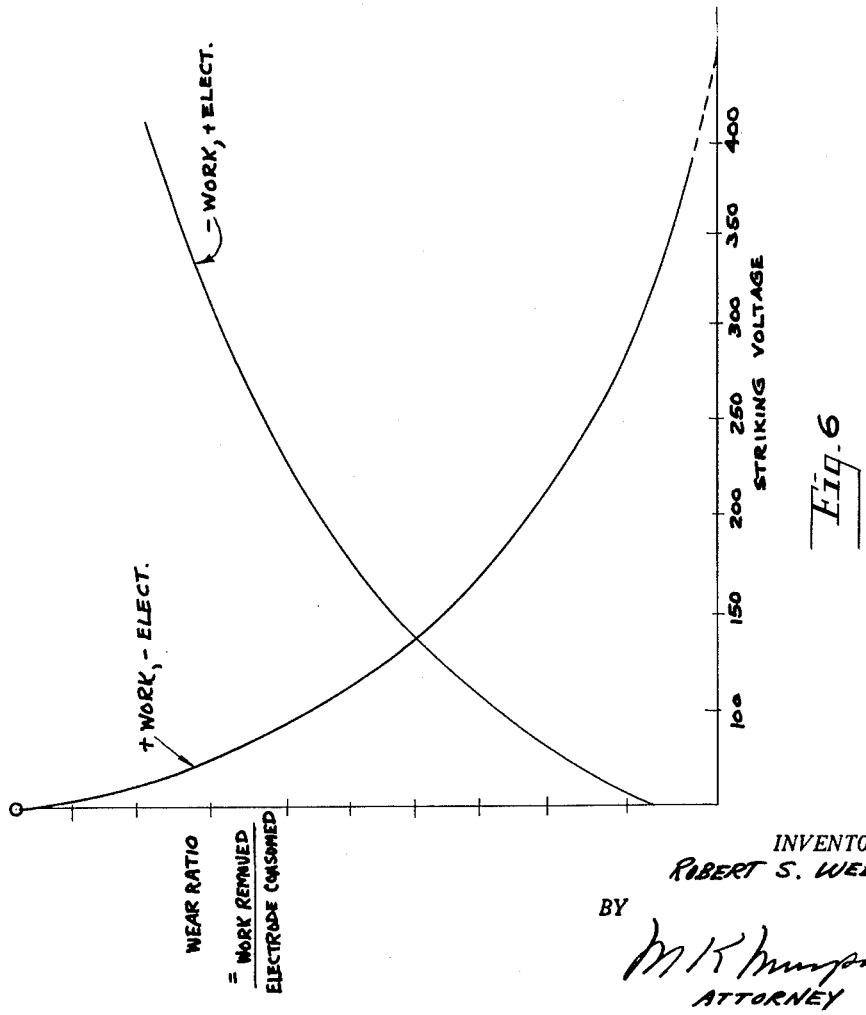
INVENTOR.
ROBERT S. WEBB
BY
M K Murphy
ATTORNEY INVENTOR.
Robert S. Webb
BY M. K. Murphy
ATTORNEY.

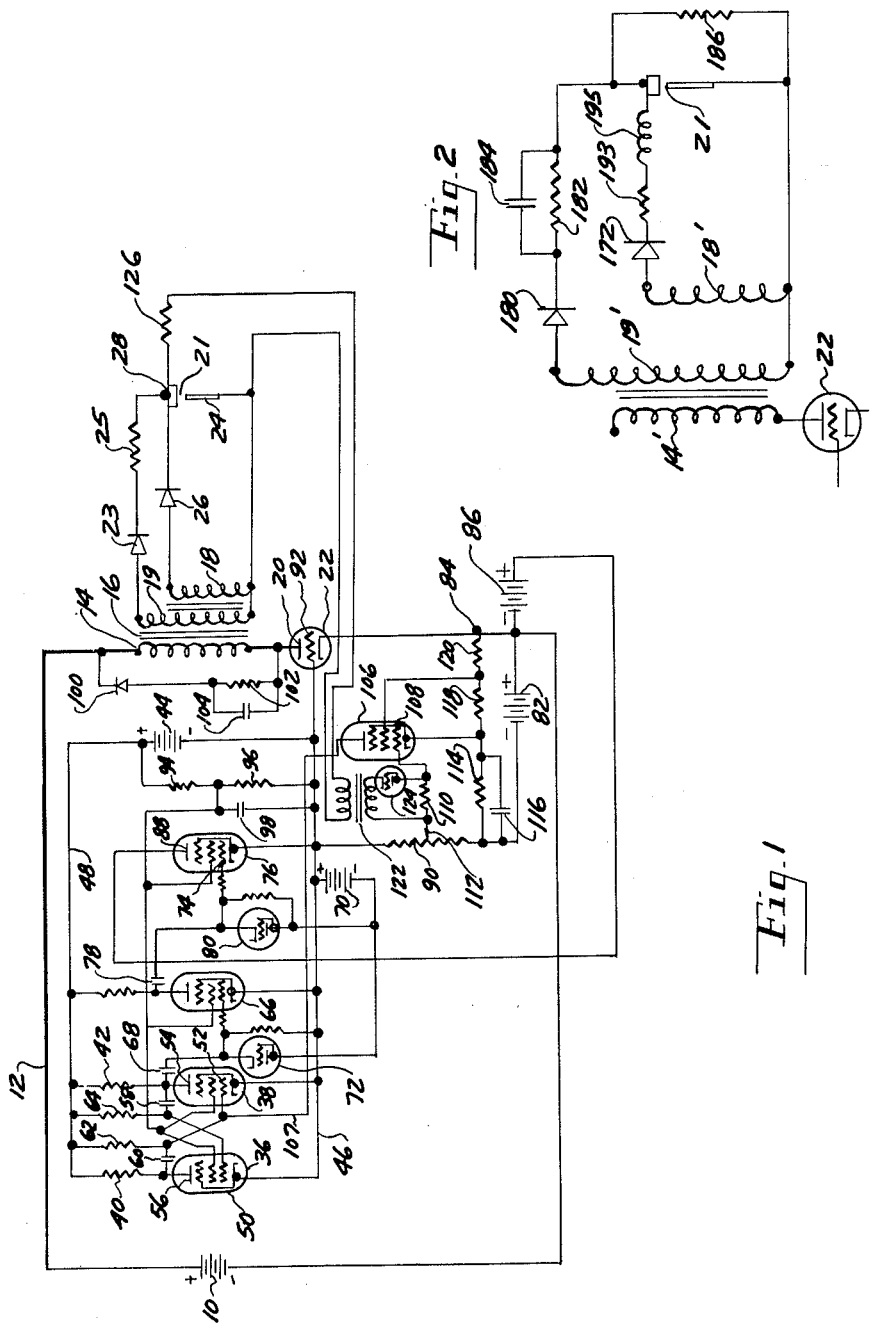

3,158,728
HIGH VOLTAGE-REVERSE POLARITY EDM
Robert S. Webb, Bloomfield Hills, Mich., assignor to Elox Corporation of Michigan, Troy, Mich., a corporation of Michigan
Filed July 26, 1960, Ser. No. 45,336
7 Claims. (Cl. 219—69)

This invention relates to electrical discharge machining, sometimes referred to as EDM, and sometimes as spark machining or as arc machining.

Use of EDM for machining hard materials such as hard steels and cemented carbides used for forging dies has increased tremendously in recent years. As is now generally known, the electrical-discharge-machining process comprises disposing an electrode of negative polarity in spaced proximity to a workpiece of positive polarity to be machined and causing intermittent electrical discharge between the electrode and workpiece in the presence of a coolant, in consequence of which the workpiece is eroded. the shape and form of the eroded hole is complementary to the electrode.

It is possible by means of EDM to produce very economically, identical dies by the following method. A die is produced in the normal manner, i.e. by Kellering and hand finishing. An electrode or series of electrodes is then cast using the die cavity as a mold. The electrode may be then used to produce an infinite number of identical die cavities by EDM.

One difficulty with the above mentioned method is connected with the fact that in the EDM process, there is erosion of the electrode as well as the workpiece during the machining operation. This electrode erosion is caused by bombardment of the eroded particles machined from the workpiece, and other things, and renders it necessary to replace electrodes frequently, especially when machining deep or intricate cavities, in order to obtain the desired accuracy of the finished hole.

Various electrode materials have been tried with varying degrees of success. A suitable electrode material must be of low cost, easily obtainable, easy to cast or machine and must have a favorable wear ratio in use. Most materials in common use lack one or more of these desirable characteristics. For example, commercial brass has a wear ratio of only about 3 to 1, is fairly easy to machine, but is difficult to cast, which renders it expensive to use in instances where a deep intricate cavity is required because many electrodes are used and the EDM apparatus must be shut down frequently to change electrodes. Commercially pure zinc is easily cast, but its wear ratio is only 7.5 to 1. A number of alloys of zinc, particularly zinc-tin alloys, have been tried with significant increase in wear ratio.

An electrode of zinc, brass or other material plated with chromium to a thickness .0001 or greater provides a wear ratio, when machining steel, of 50 to 1 in high current density roughing operations and wear ratios in the order of 100 or better to 1, in low current density finishing operations.

The above is generally true with EDM gap voltages of comparatively low magnitude—in the order of 30 to 150 volts, and various means have been resorted to in reducing or counteracting electrode wear.

Recently the advantages of using relatively high gap voltages for ionizing or breaking down the machining gap have been realized. In my copending application Serial No. 29,363, filed May 16, 1960, of which the present application is a continuation-in-part, I show a method and means for electrical-discharge machining which involves utilizing a high gap striking voltage superimposed upon a lower machining voltage. This type of circuit has many advantages as pointed out in that application.

In some instances, particularly in roughing holes and cavities by EDM, a high machining voltage is desirable. This voltage may be in the order of 400 to 600 volts and even higher, up to several thousand volts, in special applications.

When the gap voltage exceeds the commonly used machining voltage of 30 to 150 volts, with negative polarity electrode, two effects become immediately apparent: the electrode wear increases enormously, and the gap discharge fans out conically. The first effect renders the process economically unworkable in most instances, particularly where electrodes of intricate form are involved. The second effect results in an overall reduction in machining efficiency and in increased overcut which means, of course, a reduction in accuracy of cut and finish.

I have found that at gap voltage magnitudes above about 150 volts and certainly at magnitudes above 400 volts, a reversal of gap polarity effects an immediate reduction in electrode wear and an increase in machining efficiency, accuracy and finish.

It is therefore the principal object of my invention to provide an improved method and apparatus for EDM which makes possible the use of higher gap striking voltages and higher gap machining voltages than those now in use with improved performance.

Modern high-performance EDM apparatus employs electron tubes or transistors in the power circuit.

Electron tubes commercially obtainable are severely limited in their power carrying capacity. These devices are high-voltage, low-current devices. The machining gap in EDM apparatus after ionization, on the other hand, has a voltage drop of only about 15 volts. The present method of achieving high machining rate is to pass as high as possible current through the gap which necessitates paralleling tubes in banks, sometimes hundreds in number.

For example, in one EDM machine currently in use, a bank of 150 type 6AS7 vacuum tubes connected in parallel comprise the power supply to the machining gap. A 115 volt input supply is connected to the machine and the circuit interruption characteristic is such that power pulses are delivered to the gap approximately one-third of the time. The peak current is about 150 amperes and the average current about 50 amperes, the voltage drop through the power circuit being about 100 volts. It is known, however, that 6AS7 tubes and some other types are capable of interrupting circuits with voltages much higher than 115 volts.

Accordingly, it is another object of my invention to provide an improved EDM circuit wherein much higher currents are delivered to the machining gap with the same number of vacuum tubes and with substantially the same type of interruption circuit as is now in use.

Another object is to increase the overall power efficiency by a very substantial amount and to make possible utilization of the full voltage carrying characteristic of the tubes.

A further object is to effect a decrease in the bulk and cost of EDM power supplies for given requirements.

Still another object is to provide in apparatus of the aforesaid type, means for superimposing on the machining voltage pulse a voltage pulse of much higher magnitude and selected polarity thereby providing increased overcut where a particular increase in gap size is desired, and improved power feed stability due to the larger gap clearance.

A still further object is to provide a machining circuit utilizing transistors instead of electron tubes which incorporates the above advantages.

Other objects and advantages will become apparent from the following specification which, taken in conjunction with the accompanying drawings, discloses preferred forms of my device.

In the drawings:

FIG. 1 is a schematic wiring diagram of a typical EDM power supply constructed in accordance with my invention;

FIG. 2 is a modification of the FIG. 1 circuit in which a current limiting network is used;

FIG. 3 is a modified circuit designed to operate at high current but low frequency and useful principally for roughing purposes;

FIG. 6 is a graphical representation of the relationship between wear ratio and gap striking voltage with different polarities across the gap;

FIGS. 7–9 are enlarged representations of gap conditions in the operation of my improved process;

Figures 4, 5:
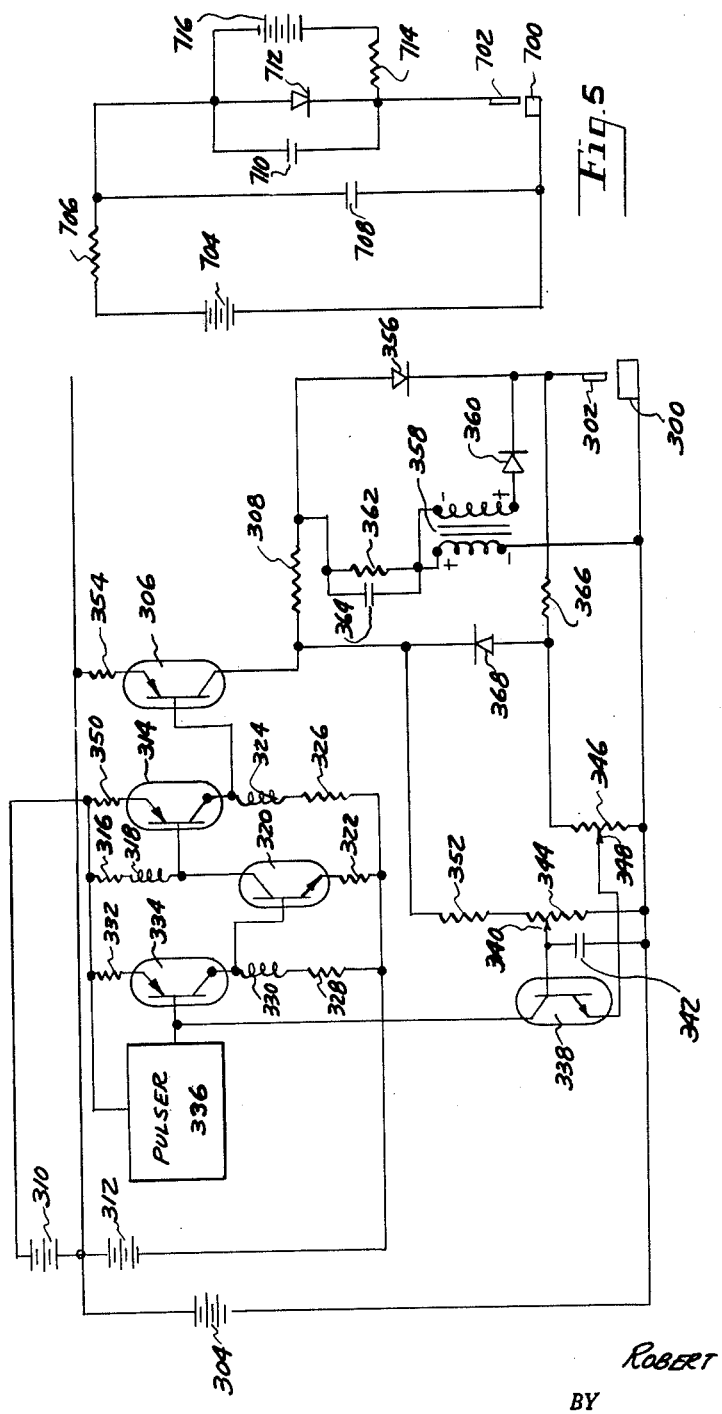
FIG. 4 is a modification of the circuit utilizing transistors instead of electron tubes.
FIG. 5 is a further modification showing the superimposed high striking voltage principle applied to a relaxation oscillator circuit.

It will be understood that in the apparatus about to be described, automatic servo power feed of the machining electrode is contemplated, in accordance with present day practice in the EDM art. The details of such a power feed have been omitted in the interest of brevity, and reference is made to my copending applications, Serial No. 805,989, filed April 13, 1959, now Patent No. 2,962,630, issued November 29, 1960; and Serial No. 15,505, filed March 16, 1960, now Patent No. 2,984,761, issued May 16, 1961; for examples of power feeds suitable for use with the apparatus herein described.

Referring for a moment to FIGS. 7–10 inclusive, which figures illustrate typical EDM gap discharges under conditions about to be described, FIG. 7 shows a section of the electrode and workpiece spaced apart by the gap in which dielectric coolant is present. In this instance, the electrode is negative and the workpiece positive, as in a conventional low voltage machining operation. The electrode or cathode discharge area diameter is indicated at 402 and the corresponding workpiece or anode discharge area diameter at 404.

Represented in this same diagram is gap 406. In EDM, as commonly employed today, the working gap 406 is many times smaller than either diameter 402 or 404. For example, during a rough machining operation with a brass electrode on a substantially ferrous workpiece, diameters 402 and 404 are approximately 0.020 while during that condition, gap 406 comprising the total space between the electrode and work face is a maximum of 0.003 or about ⅐ of the machining diameter of discharge. In a finishing operation depending upon the machining current used, a typical configuration would consist of an electrode and workpiece discharge diameter of approximately 0.001 and a gap for that operation for the same type of machine of approximately .0005.

The gap discharge has a definite tendency to fan out or increase in diameter in the direction of electron flow, which is, of course, from negative to positive.

Study of electrical-discharge-machining phenomena has revealed that, even with an electrode of very small cross-sectional area, discharges occur between the workpiece and different areas of the electrode as the machining progresses. Several discharges may take place between the same areas of workpiece and electrode, the discharge path may then move to a remote spot on the electrode face, then to another spot, etc. In other words, a single discharge never takes place over the entire face of the electrode, but represents a continuously moving point on the electrode with each successive discharge. This is because of the variable dielectric of the gap caused by erosion of the workpiece and electrode, accumulation of sludge in the gap, non-uniformity of coolant dielectric strength, etc.

Furthermore, it has been found that concentration of the area of discharge, both on the electrode and on the workpiece, at a given energy level, results in a higher metal removal rate. Putting it another way, it has been determined that narrowing of the area on the electrode face from which the discharge takes place will improve the machining rate; and if the discharge is prevented from "fanning out" and is concentrated on a narrow area of the workpiece, a greater improvement in metal removal rate is achieved.

This may be demonstrated by reference to the following equations:

$$W = I^2 R$$

where $W$ represents the power in watts passed across the gap, $I$ the current and $R$ the resistance.

$$R = \frac{PL}{A}$$

where the resistance $R$ of an element is equal to the resistivity $P$ times the length $L$ divided by the area.

Solving algebraically, $$W = \frac{I^2 PL}{A}$$

The area $A$ in this case represents the area of the pit mark in the workpiece to which a particular discharge occurs. It is thus apparent that as the area is decreased for a given current, the wattage dissipation increases in the workpiece thus effecting an overall increase in efficiency, inasmuch as the wattage dissipated represents stock removed from the workpiece.

It is thus apparent that the smaller the workpiece area of discharge the greater the machining efficiency; and if the discharge can be narrowed as it reaches the workpiece or at least prevented from fanning out, a further improvement will result.

Additional experimentation reveals that metal removal as effected on the workpiece is caused by more than one factor of which vaporization of a portion of the metal is a strong contributing part, but not the sole method of metal removal. If metal removal were exclusively a function of pit mark diameter then it would be logical to assume that an electrode and workpiece of the same composition would have a higher electrode wear in that the pit mark is in most cases smaller on the electrode than it is on the workpiece, thus representing a higher metal removal efficiency on the electrode than the workpiece. Empirical testing reveals that this is not the case but rather that use of the same material as an electrode and workpiece will cause an electrode wear of approximately two to one, that is, two parts of workpiece removed to one part of electrode. From this, it is apparent that vaporization is only a part of the overall picture of metal removal but that diameter of pit mark is irrevocably tied in to metal removal. This is further substantiated in the high metal removal coolant in that the increased metal removal is effected on the workpiece only and not on the electrode. That is, for a standard power supply having a workpiece removal rate of .6 of a cubic inch per hour, the brass electrode removal rate is also approximately .6 of a cubic inch per hour. In the high metal rate coolant, the electrode removal or wear remains at .6 of a cubic inch per hour and the workpiece metal removal increases by a factor of 2 to 1.2 cubic inches per hour, thus indicating no volumetric increased electrode removal and a resulting improvement in electrode wear as well in this coolant.

An EDM working gap is composed of three factors: (1) the clean or unadulterated dielectric fluid, (2) the conductive particles or sludge constituting original contamination, (3) cuttings or machining sludge resulting from the particular EDM operation. It is well known in scientific fields that the definition of a dielectric sets forth the property of a material to resist the flow of electric current and that dielectric strength is the ability of the material to resist an impressed voltage gradient and dielectric strength is normally described as volts per thousandth inch required to break down the given dielectric. For example, a fluid having a dielectric strength of 250 volts per thousandth inch results therefore in a clean coolant gap of .0002 inch for 50 volt striking voltage and of .001 inch for 250 volts striking voltage. Correspondingly, if the striking voltage were increased to 2500 volts, that same fluid would have a clear dielectric gap of .010 inch. In addition, an EDM gap contains the original contamination of the dielectric which may be metallic particles not filtered from previous operations or may be intentionally added impurities, such as a water-in-oil emulsion of an electrolyte.

It is a known electrical phenomenon that electrons, since they have a like electrical charge, tend to mechanically repel one another. Similarly, two conductors in proximity to one another tend to repel each other when carrying a current in the same direction or oppositely tend to attract one another when carrying current in opposite directions. This same electro-mechanical phenomenon results in an EDM machining gap in that electrons flowing from a negative element tend to fan out in the gap before approaching the positive element. In a normal machining gap encountered in high frequency low voltage EDM, the gap is so short in comprison to the relative cathode and anode areas that this effect is virtually negligible. The important concept of this invention, however, is to create conditions such that this gap or spacing between the electrode and work is not negligible and in so doing to create favorable conditions of efficient machining of the workpiece and minimum or no electrode wear.

Such an advance is shown in FIGURE 8, in which the workpiece is intentionally made negative and the electrode positive. In FIGURE 8, such a favorable condition is represented in which workpiece discharge diameter 410 may be considered equal to workpiece discharge diameter 404 of FIGURE 7. By any of several means, included among them, high striking voltage or a water in oil dielectric or several other means to be described, an increased gap is caused between the electrode and work represented by gap 412 in comparison to gap 406. In the gap shown in FIGURE 8, the gap or distance traversed by the electron flow is no longer negligible and the fanning action is pronounced and is demonstrated by the much larger diameter 408 of FIGURE 8. A still more improved condition is shown in FIGURE 9, in which workpiece discharge diameter 416 may be considered equal to 410 or 404 for purposes of analysis and gap 418 is much larger than gap 406 or 412, resulting in a still larger anode or electrode area 414. It is possible to properly increase this spacing between work and electrode sufficiently that the concentration of heat and electrical energy at the electrode is lower than that required to cause melting or vaporization of the electrode. Such a condition is readily exemplified by the cathode-anode relationship in a mercury pool rectifier in which the cathode spot is a very small dimension and super-heated such that it vaporizes portions of the mercury and conducts electron flow to the anode of the mercury pool rectifier which suffers no wear or loss of volume since the conducting path is greatly increased in diameter and the corresponding energy concentration and ion velocity is much less. In the case of the mercury pool rectifier, there is no anode wear. Such an improved condition may not be entirely practical in EDM since the corresponding working gaps would become excessively large resulting in loss of detail and extremely dangerous working voltages to produce the necessary gap.

It must be remembered that the workpiece material is frequently of a much higher melting and vaporizing temperature than the electrode and even when separated by distances of 10 to 20 thousandths, the temperatures in excess of 6,000° required to vaporize tungsten in the case of a tungsten carbide workpiece may still cause excessive thermal effects at a gap distance acceptable from an accuracy and efficiency standpoint. In any case, however, the operation is improved and better efficiency resulting in somewhat increased metal removal rates and substantially decreased electrode wear may be effected by even nominal increases in working voltage, particularly when coupled in light of this information with a specially contaminated coolant and the proper selection of electrode and workpiece materials. From this disclosure, it may be seen that the important factor to be considered for proper polarity of machining is a properly increased working gap and a negative workpiece and positive electrode, the opposite of that normally used.

There are occasions in particular combinations of electrode and workpiece materials in which several factors occur, resulting in an exception to this negative workpiece positive electrode rule. The first of these important exceptions occurs in respect to a low melting point electrode or an electrode material having a melting or boiling point substantially below the workpiece material, such as brass on tungsten carbide or a special EDM zinc alloy such as described in Larking Patent No. 2,863,766, a special low melting zinc alloy used in conjunction with steel workpieces. In such instances where a pronounced difference in thermal capacity between the electrode and workpiece results, improved electrode wear may be effected with somewhat higher voltages and standard polarity. In instances such as this, the change in dimension of the arc such as from diameter 402 to diameter 404 is not as important as the increased spacing and corresponding increased thermal separation between the high melting workpiece and low melting electrode. Low melting elements and alloys are characterized by a relatively large cathode area to sustain an EDM pulse. The reason for this is unimportant, it being important only to consider that in such cases relatively little increase in diameter occurs for normal increases in gap distance. Such materials are improved more by the better thermal separation between the extremely high temperature workpiece and correspondingly low temperature electrode. In instances such as this, if a negative workpiece and positive electrode are used, the corresponding cathode area of the high temperature material becomes extremely concentrated and in order to support conduction between the workpiece and electrode results in extremely high temperatures, thereby melting the electrode. In other words, at a current density and energy concentration sufficient to maintain the high temperature material as a cathode, the low temperature electrode as an anode fails by areas in which large "globs" of molten metal collapse from the electrode face completely departing from normal EDM. In these instances, better efficiency results with somewhat increased voltages and standard polarity, never resulting in gaps greater than .030. It is for this reason that selected polarity for machining be chosen in accordance with these factors whether high voltage or low voltage.

Similarly, the rule is exactly the opposite in the rare instances in which a high temperature electrode material is used to machine a low temperature workpiece with low voltage. Such is the case when copper tungsten, a sintered product containing approximately 75% tungsten and 25% copper is used to machine iron or low temperature steel alloys or the rare applications where it is used on brass or zinc base materials. In such an instance, from the foregoing analysis, it would obviously be most efficient to apply standard polarity, maintaining a negative copper tungsten electrode with respect to the positive low temperature workpiece.

It follows from the above that, if a condition can be developed wherein the cathode area of the workpiece is much smaller in diameter than that of the electrode, more efficient machining of the work will result with reduced wear on the electrode. This occurs normally when hydrocarbon coolant is used in the gap and the gap polarity is the reverse of normal, i.e. positive electrode-negative workpiece.

Specific circuits for achieving the beneficial results described above may take many forms. I have used those shown in FIGURES 1 to 5 successfully, and they will be described as preferred examples only.

Referring now to FIGURE 1, it will be seen that I have shown at 10 the main power supply for the apparatus, which comprises a 300 volt, D.C. supply, this voltage being about maximum for the plate supply of the 6AS7 power tubes.

It will be understood that this voltage may be supplied by almost any suitable type of power supply, a three phase A.C. transformer and rectifier set being preferred. The details of this unit and the tube filament power supply have been omitted from the drawing in the interest of simplification.

A lead 12 from the positive side of the power supply connects to one side of primary 14 of the power transformer 16. The latter has a secondary 18 and is of the iron-core type, although an air-core transformer may be used for more delicate machining, particularly finishing operations.

An additional secondary winding 19 of relatively low power, high voltage characteristic is connected in parallel with the machining gap 21 through a rectifier 23 and a resistor 25.

The other side of primary 14 is connected to the anode 20 of a power tube 22. It will be understood that the tube 22 represents a bank of tubes (in this instance 6AS7's) connected in parallel. Almost any number of such tubes may be so connected to provide the required power flow through the gap.

It is further understood that any suitable power tube or bank may be used in place of 22 and may be of triode, tetrode or pentode construction, it being important only that a vacuum control device be used.

The secondary 18 of the power transformer 16 is connected at one side to the electrode 24, and at the other side to a workpiece 28 through a blocking diode 26.

The power tube bank 22 is controlled by a multivibrator network which comprises tubes 36 and 38. These tubes are preferably pentodes, type 6DQ5. The plates or anodes of these tubes are connected through load resistors 40, 42, and lead 48 to the positive terminal of a suitable power supply 44, the negative terminal of which is connected with the cathodes of the tubes by lead 46. The power supply 44 may be separate or it may be derived from the main supply 10 as desired.

The control grids 50, 52, of the tubes 36, 38, are cross-connected to the anodes 54, 56, respectively through coupling condensers 58, 60, and are connected to the positive side of the multivibrator power supply through the grid resistors 62, 64.

The output signal from multi-vibrator tubes 36, 38, is fed into an amplifier, which may comprise one or more pentode tubes 66, through condenser 68 and clamped to negative bias voltage 70 through diode 72. The amplified and resquared signal from tube 66 is fed to the grid 74 of pentode 76 (which may be one of a bank) where it is again amplified before being fed to the power tube bank 22. The coupling to the "driver" tube 76 is through a coupling condenser 78 and a clamping diode 80 is provided to insure positive cut-off characteristic. Suitable isolation and signal resistors are also provided as shown to control the operating characteristics of diodes 72 and 80.

The power required to drive the main power tube bank 22 is in the order of several hundred watts, and to obtain increased efficiency, the amplifier 76 is floated in the grid circuit of the bank 22 rather than connected to the negative terminal of bias supply 82 as would be expected. Since the control signal appears between the cathode of driver 76 and point 84 of the circuit which is grounded, the network just described, which comprises a multivibrator and two stages of amplification, may be thought of as a floating signal source.

The output signal from this network is of rectangular wave form and is of substantially greater magnitude than that obtained from the conventional square wave generator. Normally these signal generators have an output of approximately ten watts. In the EDM circuit of FIG. 1, the power required to drive the grids of the tube bank 22 is in the order of two hundred watts and more. A booster power supply 86 is preferably provided in series with the bias supply 82 to provide adequate voltage for the plate 88 of driver 76.

The output signal from driver tube 76 is developed from the voltage drop across variable resistor 90, which signal pulse with the added voltage of power source 82 constitutes the drive to the grids 92 of the bank 22. Proper adjustment of the circuit parameters will provide a signal at grids 92 having a selected on-time characteristic.

As stated above, the signal generator power supply is the source 44. Resistors 94 and 96, the latter being shunted by a condenser 98, are provided as shown, to provide screen grid voltage for tubes 36, 38, 66 and 76.

The primary 14 of transformer 16 has a damping network consisting of diode 100, resistor 102 and shunt capacitance 104 connected in shunt therewith.

The transformer 16 must be a stepdown transformer capable of handling relatively high currents at relatively high frequencies. The development of extremely thin iron lamination stock and specialized design now makes possible the design of transformers having the characteristics required for the circuit of FIG. 1. The transformer selected should have a maximum voltage swing on the primary equal to the peak voltage rating of the power tube selected and a turns ratio which will match the gap voltage required in EDM.

The aforementioned damping network limits the induced voltage or negative fly-back in the primary 14, which occurs between power pulses, to the voltage rating of the tubes 22 and this prolongs the lives of these tubes.

As so far described, it will be seen that the tube bank 22 normally is biased to non-conducting condition by voltage source 82. An amplified signal from the multi-vibrator will be impressed on the grids 92 of the power bank 22 and will overcome the normal grid bias and render the tube bank conductive. In accordance with the preselected adjustment of the circuit parameters, a voltage will occur across the primary 14 which will induce a voltage in the secondary 18. This secondary voltage is instantly effective across the gap between electrode 24 and workpiece 28, and a power pulse will be delivered across the gap eroding the workpiece. At the same instant, the full voltage of secondary 19 is applied to the gap in parallel with the pulse from winding 18. Once the gap is fired, the current buildup will, for all practical purposes, cut winding 19 out of the circuit because of the loading of the resistor 25. Substantially all of the power to the gap will be delivered by winding 18. The characteristic of winding 19 may be chosen to provide any desired striking voltage as this higher voltage is blocked from winding 18 by rectifier 26. This permits the latter winding to be designed for optimum power delivery to the gap. This sequence is repeated at high frequency until the machining operation is completed or the operation is interrupted by the machine's power feed, as is known in the art.

The gap between electrode 24 and workpiece 28 is flooded with dielectric fluid during machining as is common in EDM.

The circuit of FIG. 1 includes a "watch-dog" which functions automatically to cut-off the power to the gap in event of a short circuit condition, which might damage the workpiece, or in event of malfunction of the apparatus, which might cause damage to the workpiece or to the components of the apparatus.

This "per pulse cut-off" comprises a pentode 106, the control grid 108 of which is connected through a resistor 110 to tap 112, which latter taps the keying resistor 90 at an intermediate point. The grid 108 normally is biased non-conducting by the shunt resistor and condenser network 114, 116, which is connected across the voltage source 82 through the screen voltage resistor 118 and the voltage reducing resistor 120. The voltage across resistor 90 plus that of the source 82 is, of course, the voltage which drives the grids 92 of the power tube bank 22. A selected portion of this voltage is thus effective on the grid 108 of cut-off tube 106 and tends to render tube 106 conductive whenever bank 22 is rendered conductive. The plate of tube 106 is connected to the grid circuit of multivibrator tube 38 by line 107 and conduction through tube 106 will instantaneously cut-off operation of the multivibrator.

However, the secondary of a transformer 122 (called for convenience the "cut-off transformer") is connected across the resistor 110 through a blocking diode 124. The primary of the transformer 122 is connected across the gap between electrode 24 and workpiece 28 through a limiting resistor 126.

If the apparatus is functioning normally, a drive signal on grids 92 of the bank 22 will result in a striking voltage appearing across secondary 19 of power transformer 16 and the gap will fire. The voltage of winding 18 would have to be only about 20 if there were no losses in the firing circuit. However, normal circuit losses require a voltage magnitude of 60 volts or more, and should a short circuit occur across the gap, the short circuit current would be almost 150% of normal. With narrow pulse operation, the peak current selected is usually the peak pulse rating of the individual tubes of the power tube bank, and a 150% overload of this pulse current would strip the tube cathodes with comparatively few pulses. Thus ordinary short circuit cut-off devices, such as thermally responsive devices, operate too slowly to provide protection.

My per-pulse cut-off device permits the power circuit to be operated with maximum efficiency because it renders it unnecessary to limit the power input to the gap to less than maximum desired on account of possibility of short circuits. The cut-off device operates to cut off the power input instantaneously, that is to say, in about 5% of the period of a power pulse, and thus provides complete safety to the apparatus. This cut-off device is extremely important in the operation of the machine especially when precision machining of expensive workpieces is being performed, where heat checking of the hole being cut might require scrapping of the piece. The readiness of the device to function instantly is constantly maintained by the precise balancing of the circuit parameters. The connection of grid 108 to the keying resistor 90 tends to render tube 106 conductive each time the multivibrator pulses, but the dominating negative bias of the network 114–116 inhibits conduction of tube 106 in the absence of any keying signal. During normal operation, the keying pulse voltage developed across resistor 90 is exactly neutralized in the grid circuit of tube 106 by the action of circuit 122, 124, 110. However, appearance of a voltage across primary of transformer 122 (gap voltage) lower than a preset minimum will upset this voltage balance and instantaneously cause tube 106 to conduct and cut off the multivibrator through line 107. It is, of course, clear that the "leading edge" of the power pulse just initiated will cross the gap, but the cut-off is so fast that the power pulse will be literally squelched after initiation and no appreciable power will be delivered to the gap.

Interruption of operation of the multivibrator will, of course, cut off tube bank 22 as well as tube 106. After the normal pulse repetition delay time, the multivibrator will resume pulsing, and if the trouble in the gap which caused the abnormal low voltage has cleared, such as by back-up of the power feed, clearing of sludge, or the like, normal machine operation will be restored automatically.

It will be understood that the cut-off circuit shown is not limited to use with the particular power delivering circuit shown. It would be equally useful with other gap power circuits whether of the impedance matching type or not.

Reference is made now to FIG. 2 which shows a modification of the circuit in which a resistor is connected across the machining gap, a condenser-limiting resistor network 182–184, is connected in series with a diode 180, to the high striking voltage winding 19' with resistor 186 connected across the gap as shown. This circuit provides for increased current flow from winding 19' during the initial portion or leading edge of a particular power pulse. Thus a relatively low impedance striking pulse is delivered which quickly ionizes the gap and forces conduction, the additional power from condenser 184 assisting.

In this circuit, the resistor 182 may be of relatively high value thus achieving increased efficiency during the machining portion of the cycle, since little power is drawn through the resistor 182 thereby allowing increased power to flow from the more efficient low voltage winding 18'. In addition, the average or R.M.S. voltage wave form impressed across the gap is substantially less and consequently the hazard to the operator and to the equipment is less. Low voltage winding 18' is connected across the gap through diode 172 as shown with the numerals 193 and 195 representing, respectively, the lumped resistance and inductance in the circuit.

The important factor in the operation of these circuits is the very high striking voltage which initiates each gap discharge and thus makes possible use of a wider gap which improves power feed stability and makes possible large overcut when such is required and the use of reversed gap polarity at voltages in excess of 150 or so to provide increased machining rate and decreased electrode erosion.

Reference is now made to FIG. 3 which shows a form of circuit particularly suitable for roughing purposes. Here, single phase A.C. line voltage is used for input and the output to the gap is of low frequency, 120 cycles for example.

A stepdown transformer 204 has a primary winding 206 connected across line terminals 208, 210, and a secondary 212 across which is connected a full wave rectifier 214. The latter has balancing resistors 216 across each diode. The negative output of this rectifier is connected to the workpiece 200 in this instance, and the positive output is connected through resistor bank 272 to the machining electrode 202. The flow of gap current is controlled by the number of resistors 220 in the circuit, switches 222 being provided for controlling the bank. Note that resistor 218 is permanently connected, thus providing low impedance in the power loop at all times. The output of this network is full wave rectified A.C. which presents to the gap 120 cycle pulsating D.C. power.

A trigger circuit for providing high striking voltage is associated with this low frequency supply. Connected directly to the single phase input lines 208, 210, is a full wave rectifier network 224 having in its output a current limiting resistor 266 and storage condensers 226. Also connected across the input line is a transformer 228 having a primary 230, and secondaries 232, 234, 236.

Secondary 232 supplies filament voltage to trigger thyratron 256. Winding 234, in conjunction with diode 238 and current limiting resistor 240, provides D.C. bias across condenser 242 and resistor 244 for maintaining thyratron 256 normally non-conductive.

Secondary 236 of transformer 228 is connected to full wave rectifier 246 which has in its output saturable transformer 252, series connected with a network consisting of resistor 248 in parallel with condenser 250. Transformer 252 is wound of oriented sharp knee iron such that it has a very sharp saturation characteristic and is provided with sufficient primary turns that it saturates readily during only a portion of the applied rectified A.C. voltage. After a brief portion of the pulsating D.C. voltage transformer 252 saturates and draws sufficient current to charge condenser 250 and maintain conduction through resistor 248. The resultant voltage generated across transformer 252 is a sharp spike of voltage occurring at the appropriate point in each cycle of the pulsating rectified line voltage. This sharp spike of voltage across current limiting resistor 254 serves to trigger thyratron 256 since the secondary of transformer 252 is phased to cause conduction of thyratron 256. Thus, at a time near the beginning of each of the 120 pulses per second output, thyratron 256 is triggered into conduction. This triggering point occurs when the pulsating voltage output of rectifier 246 exceeds the residual voltage across condenser 250.

During a condition of open circuit, in which the gap between the electrode 202 and workpiece 200 is too great for conduction, a sharp high current surge is drawn through inductance 262 and a corresponding voltage is developed across transformer 264. In this open circuit condition, only the magnetizing current of transformer 264 flows through resistor 270. The time constant of choke 262 and condenser 260 is selected to produce a very brief interval for surge of current flow and a short duration pulse of voltage across transformer 264. As condenser 260 becomes charged to a voltage roughly equal to that stored across condenser network 226, the stored energy in the field of inductance 262 sustains conduction of thyratron 256 overcharging condenser 260. After collapse of the inductive energy in inductance 262, condenser 260 is overcharged to a voltage approximately twice that of condenser 226.

The resultant voltage at that instant around network 226, 256, 262, 260, is such that a negative voltage occurs on the plate of thyratron 256. This negative voltage in accordance with the characteristics of thyratron operation de-ionizes thyratron 256 and thus allows the grid of thyratron 256 to regain control, which at that instant is biased negative by condenser 242. Thus, a sharp pulse of voltage is applied across the working gap from the secondary of transformer 264 through diodes 268; and this sharp high voltage pulse occurs in-phase and corresponds to the power pulse from transformer 204 and the appropriate power network.

Should the gap ionize, and conduction result, current is drawn through diode 268 and secondary of transformer 264. This current flow is limited by resistor 270 series connected in the primary of transformer 264 to a value in accordance with the design. Should the working gap be shorted and result in no voltage across transformer 264, resistor 270 has sufficient resistance to allow choke 262 to function properly by overcharging condenser 260. Were it not for resistor 270, extremely high damaging currents would flow through thyratron 256 and no current would flow through choke 262 and in this instance, condenser 260 would not overcharge. Since a negative voltage would not be applied to the plate of thyratron 256 during this failure condition, D.C. conduction would result and the grid of thyratron 256 would have no control. Once D.C. conduction resulted, the machine would have to be shut off to allow the grid to regain control. Thus, the trigger pulses for high striking voltage pulses would disappear. For this reason, it is essential to achieve the proper balance between condenser 260, choke 262 and resistor 270. It is only necessary that resistor 258 be of such magnitude to limit the rate of discharge of condenser 260. Typical surge conditions through thyratron 256 would include a peak current of 300 amperes and an average or D.C. current of 5 amperes. Through use of storage condenser 226, greatly increased current flow results during the striking voltage pulse for short duration than would otherwise be possible. In this manner, power economy is achieved since the striking voltage pulse lasts for a very brief portion of each cycle and the bulk of the machining power is delivered through transformer 204 at a low voltage level, just high enough to sustain conduction of the desired magnitude through resistor network 272 and to limit current flow through the working gap on short circuit, since it is readily apparent that no short circuit current control exists. This circuit has one outstanding advantage not possible in any of the other forms of superimposed high striking voltage and that is through use of thyratron 256 and the triggering network, not only very high voltage may be generated but also high current during the brief interval of triggering circuits. This particular circuit is limited maintain the gap even at an increased distance since it disintegrates any medium impedance stringers or short circuits that may tend to bridge the working gap and observation of its performance indicates somewhat better reliability than the other high voltage, high impedance triggering circuits. This particular circuit is limited to twice the frequency of the input A.C. voltage and also to the relatively low frequency of operation for the thyratron which under no circumstances could exceed 1000 cycles per second for most commercially available xenon filled thyratrons.

It must be noted that the A.C. voltage developed across secondary 212 of transformer 204 is of relatively low magnitude compared to the triggering voltage developed from the thyratron circuit. Full wave rectifier assembly 214 must be of sufficient voltage rating to block or withstand the inverse voltage developed from the triggering pulse. In other words, this voltage is applied and divided across balancing resistors 216 such that approximately half the voltage of the triggering voltage occurs across each resistor and in this manner the power from the superimposed circuit is blocked from secondary 212 of the power transformer by this high voltage rectifier network in a manner very similar to the circuitry of FIGURE 1. The triggering pulse must be phased by the choice of resistor 248, condenser 250 to occur sometime after the rectified sinusoidal voltage output of rectifier 214 is high enough to sustain conduction through the arc.

Attention is now directed to FIG. 4, which is a circuit employing transistors for higher frequency operation and a novel network for achieving the superimposed high striking voltage. The novel network for achieving the superimposed high striking voltage comprises a step-up transformer 358 and associated components about to be described. FIGURE 4 is a circuit embodying transistors for the control of the pulsating arc power as well as in the pre-amplifier. It is essential to realize that in this instance, rectangular pulses are also generated in a manner very similar to the circuitry of FIGURE 1. In the transistor circuitry of FIGURE 4, the working gap consisting of electrode 302 and workpiece 300 is connected through dropping resistor 308, to the collector of transistor 306. The emitter of transistor 306 is connected to the positive terminal of the EDM D.C. power supply 304. The pulser amplifier for output transistor bank 306 is similar at least in principle to the circuitry of FIGURE 1. Transistor 306 is generally many transistors, perhaps hundreds of transistors capable of generating the very high output machining currents required in EDM. PNP transistor 314 may represent a bank of transistors for the preamplifier in a manner analogous to that of the tube bank 76 in the circuitry of FIGURE 1. In this circuitry, transistor driver bank 314 is nonconductive during conduction of transistor 306. PNP type transistor 306 is rendered conductive by D.C. power supply 312 through resistor 326 and choke 324. Conduction of transistor driver bank 314 connects the base of power bank 306 to positive D.C. bias 310 and thus cuts-off power bank 306 and shunts the current flow from resistor 326 and choke 324, such that the direction of electron flow in this instance is from drive voltage 312 through resistor 326, choke 324, collector-emitter of transistor 314 and back to the positive terminal of voltage 310.

Drive current during ON time of transistor 306 is furnished from battery 312 through resistor 326, choke 324 and the base emitter circuit of transistor 306 back to the positive terminal of voltage 312. Choke 324 as well as chokes 318 and 330 are included to provide sharp leading edge drive of the appropriate transistor network. During a period of conduction of transistor 314, increased electron flow is drawn through resistor 326 and choke 324 in accordance with the higher total voltage of bias 310 and drive voltage 312. As transistor 314 shuts off instantaneously, this increased electron flow is forced or accelerated through the base emitter circuit of transistor 306, thus providing sharp leading edge drive in an accelerated manner for the duration of the inductive effect of choke 324. In a similar manner, as transistor 314 becomes instantaneously conductive, the increase in electron flow through choke 324 is momentarily retarded and provides for a sharp cut-off pulse to transistor 306, thus assuring vertical rise and fall and sharp switching action of each particular transistor stage. Similarly, NPN transistor 320 drives transistor 314 drawing electron flow from drive supply 312 through bias resistor 322, emitter collector of transistor 320 and base emitter circuit of transistor 314. Electron flow is momentarily retarded through choke 318 thus providing a sharp surge to transistor 314 for turn ON through base emitter circuit of transistor 314 and bias resistor 350. During conduction a shunt electron flow also occurs through choke 318 and resistor 316. As transistor 320 is switched OFF sharply, choke 318 sustains electron flow in the same direction and sharply cuts-off transistor 314 causing cut-off electron flow through resistor 316, resistor 350 and clearing the emitter base circuit of transistor 314.

NPN transistor 320 is likewise rendered conductive by the first drive transistor shown in this amplifier as transistor 334. Thus electron flow for drive of transistor 320 occurs from the negative terminal of supply 312 through limiting resistor 322, emitter base circuit of transistor 320, collector-emitter of transistor 334, resistor 332, bias supply 310, to the positive terminal of drive voltage 312. After a short delay determined by inductance 330, a shunt electron flow is also drawn through resistor 328 and inductance 330 in parallel with network 322, 320. As transistor 334 shuts off sharply, choke 330 sustains a cut-off electron flow through base-emitter of transistor 320, resistor 322, resistor 328, thereby clearing and sharply cutting off transistor 320.

The pulser drive shown in this instance as pulser 336 may be a tube type of pulser or multivibrator as shown in FIGURE 1, or it may be a commercially available pulser of suitable characteristics, or it may be a transistor multivibrator designed for particular control of the circuitry.

In a manner very similar to that of FIGURE 1, transistor 338 operates as a per-pulse cut-off device in the circuitry of FIGURE 4. It must be noted in this instance, that when transistor 334 is rendered conductive, output transistor bank 306 is rendered nonconductive. The machining pulse in FIGURE 4 occurs when transistor 306 is conductive and is interrupted during normal operation by the conduction of pulser 336 at selected time intervals through the base-emitter circuit of transistor 334.

Prior to the start of a machining pulse, pulser 336, transistor 334, transistor 314, are all conductive biasing power transistor bank 306 OFF. In this condition, transistor 338 is also biased OFF by the absence of any drive signal in its base circuit and by virtue of the direct resistance connection from the base of transistor 338 through potentiometer arm 340 and the lower leg of potentiometer 344 through the lower portion of potentiometer 346 to the emitter of transistor 338. Since no voltage exists in this loop, cut-off transistor 338 is nonconductive. At the initiation of a machining power pulse, pulser 336 becomes sharply nonconductive, rendering transistor 334 and transistor 314 nonconductive, thus permitting conduction of power transistor 306. If the space between electrode 302 and workpiece 300 is sufficient to permit voltage across the working gap, this voltage is also presented across potentiometer 346 and a portion of this voltage is presented at tap 348. After a momentary delay interval determined by the relative magnitude of condenser 342, the upper portion of potentiometer 344 and resistor 352, a keying signal occurs at potentiometer arm 340. The per-pulse cut-off operation in this instance compares the relative magnitude between the portion of the arc voltage at 348 and the keying signal at 340. If the arc voltage is of a sufficient magnitude to overcome the voltage at tap 340, transistor 338 is maintained in a nonconducting condition and thus does not affect the operation of the power circuitry. If the voltage at tap 348 is less than that of keying reference 340, transistor 338 becomes instantaneously conductive with drive electron flow in this instance occurring from the negative terminal of power voltage 304 through the lower portion of potentiometer 346, potentiometer arm 348, emitter-base of transistor 338, the upper portion of potentiometer 344 and resistor 352, collector-emitter of transistor 306, balancing resistor 354 to the positive terminal of power voltage 304, thus rendering transistor 338 conductive. This condition of conduction corresponds exactly to the performance of the other circuits in which a voltage lower than the pre-set magnitude occurring across the arc will instantaneously render the cut-off device active. In this instance, conduction of transistor 338 drives transistor 334 in such a manner as to interrupt conduction of transistor 306, thus instantaneously squelching the faulty pulse in the output.

In a manner similar to that of the previous cirucits, transistor 338 may be so connected to directly affect the operation of the pulser by triggering the multivibrator portion of that pulser. In the circuitry shown in FIGURE 4, however, cut-off transistor 338 overcomes the action of pulser 336 and operates independently of the pulser to shut off the faulty cutting power. Performance of the circuitry in this manner has the one advantage that after the very short delay time encountered in the transistor components and the various stages of the amplifier, it is possible to re-ignite the arc immediately without waiting for the normal interval between pulses caused by pulser 336. Of course, no pulse of duration longer than that determined by pulser 336 is permitted and the action of the cut-off transistor 338 in this intsance is only to cut-off the faulty portion of any particular pulse.

The gap between electrode 302 and workpiece 300 is fed through transistor 306 which represents a bank of transistors the number of which will be dictated by the power requirements of the machine.

It may be seen from FIG. 4 that transformer 358 is connected to power voltage 304 through condenser 364, resistor 308 and power transistor bank 306 and limiting resistor 354. The secondary of transformer 358 is wound and phased such that a voltage boost is achieved from the fundamental machining power voltage 304 of the desired increase generated on the secondary of transformer 358. Diode 360 connected to the output side of the secondary of transformer 358 blocks reverse conduction through transformer 358. In a manner similar to the triggering of transformer 252 shown in FIG. 3, transformer 358 saturates sharply after the initial pulse of voltage occurs for triggering and the resultant output waveform is sharp at its leading edge, Diode 356 blocks the superimposed high striking voltage from resistor 308 and transistor bank 306. In addition, during the superimposed high striking voltage, rectifier 368 becomes conductive through resistor 366 to clip the superimposed spike of voltage from rheostat 346.

Should the electrode spacing be sufficient to ionize the gap, sufficient current is drawn through transformer 358 to charge condenser 364 such that no additional current flow occurs beyond the initial leading triggering spike. The charging time of condenser 364 is short with respect to the total pulse duration so that only a small amount of power is lost through the less efficient high voltage circuitry. The time constant of condenser 364, resistor 362, is of the order of time of the OFF time between pulses, such that condenser 364 discharges substantially between cycles.

From this analysis, it becomes apparent that the common denominator of all superimposed high voltage circuits consists of the provision for the high striking voltage and a blocking diode of a voltage rating sufficient to block this high striking voltage and a current rating sufficient to carry full machining current. In the circuitry of FIGURE 4, this diode is 356; in circuitry of FIGURE 3, the diode is 214; and so on for each specific instance.

An additional form of circuitry embodying superimposed high striking voltage is an RC type of circuit or relaxation oscillator circuit, embodying the same principle of operation. An example of this type of circuit is shown in FIGURE 5. In the superimposed high striking voltage RC circuit shown in FIGURE 5 D.C. supply voltage 704, resistor 706 and condenser 708 form the fundamental high current RC circuit for electrode 702 and workpiece 700. Resistor 706 and condenser 708 would be selected in accordance with normal design procedures for RC circuitry.

The superimposed high voltage portion is obtained from high D.C. supply voltage 716, resistor 714 and condenser 710. It may be seen that upon initiation of any charging cycle, condenser 708 is charged through resistor 706 by supply voltage 704 and superimposed condenser 710 is charged through resistor 714 by supply voltage 716. During the charging cycle, diode 712 blocks conduction from supply voltage 716. The total voltage impressed across the working gap is therefore the voltage stored across condenser 708 added to the superimposed voltage stored across condenser 710. Should the gap distance be short enough, such that a discharge results, condenser 710 is rapidly discharged through the machining gap and the balance of the current from condenser 708 discharges through the machining gap and through diode 712, thus completing one complete discharge cycle of this relaxation oscillator form of operation. As in each case with the superimposed circuitry, tremendous economy occurs, since battery 704 need only be high enough voltage to sustain the arc in accordance with normal principles of design of an RC type of circuit, and battery 716, which is the superimposed high striking voltage, need have only sufficient power to ionize the arc at the high voltage level since the bulk of machining power is supplied by D.C. power source 704. A circuit of this type is virtually mandatory where the benefits of high striking voltage are to be achieved with an RC power supply, since for any substantial machining power, extreme limit would be placed not only on the input power supply 704 but on the power dissipating capacities of resistor 706. Typical machining currents are in excess of 100 amperes and a superimposed high striking voltage in excess of 300 volts which would result in 30 kilowatts of wasted power in resistor 706. The size and cost of such a resistor suitable for an RC type EDM circuit would be prohibitive but would become entirely practical when this method of superimposed circuitry is employed. It is essential for proper operation of this circuit that the charging time constant of 708–706 be less than the time constant of 710–714 so that "triggering" occurs only when condenser 708 is substantially charged.

It will be understood from the above that the provision of a superimposed high striking voltage in connection with the regular gap voltage in EDM apparatus results, among other advantages, in greater stability of power feed operation because it permits the use of a wider gap. By making the gap spacing respond to the striking voltage rather than the lower machining voltage, the wider gap is maintained yet this wider gap is readily ionized without high expenditure of power and the finish and accuracy of cut are not impaired.

Referring now to FIG. 6, it will be seen that I have shown graphically the electrode wear ratio at different polarities and different machining voltages. The wear ratio is expressed as the ratio of stock removal from the workpiece compared to consumption of the electrode material.

It will be seen from the curves that with conventional electrode material of copper or zinc base alloy, the wear ratio is very high with negative electrode-positive workpiece gap condition, at low voltages and decreases slowly until a gap striking voltage of approximately 150 volts is reached. As the gap striking voltage is raised beyond that magnitude, the ratio falls rapidly indicating very rapid electrode consumption.

On the other hand, with the electrode positive and the workpiece negative, the effect is almost diametrically opposite. The wear ratio is low at low voltages and increases with increase in striking voltage. The curves cross at approximately 150 volts and it is apparent that at voltages in excess of 250 or so, the ratio is such that for all practical purposes, machining with the conventional negative electrode-positive work relationship is impractical.

Figure 10:
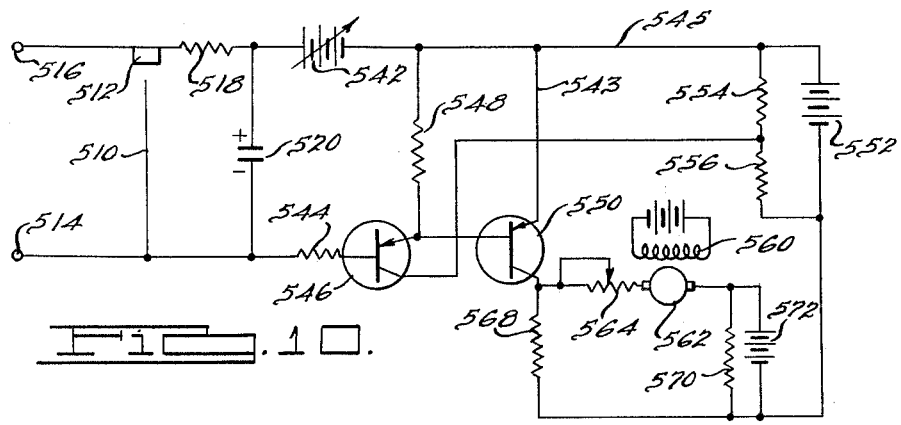
FIG. 10 is an example of a power feed circuit which may be used with the machining circuits of FIGS. 1 to 5, inclusive.

Reference is now made to FIG. 10, which shows in schematic form a power feed sensing circuit and driving circuit which may be used with any of the power circuits described above. Here a network comprising resistor 518 and condenser 520 stores average voltage across the machining gap between electrode 510 and workpiece 512 which corresponds to any of the machining gaps shown in FIGS. 1–5 inclusive, the terminals 514, 516, being connectable to the output of a suitable power supply such as the power supply 10 in FIG. 1, etc.

The condenser 520 is connected at one side to a reference voltage 542, and at the other side to the base of a transistor 546 through a limiting resistor 544. The emitter of transistor 546 is connected to the reference voltage 542 through a current limiting resistor 548 and to the base electrode of a second transistor 550. The collector of transistor 546 is connected to the midpoint of resistor 554–556, which divides the voltage 552, the latter being the voltage supply for downfeed of the servo.

The emitter of transistor 550 is connected through leads 543 and 545 to downfeed voltage 552, the latter being connected in bucking relationship to backup voltage 572 which is shunted by signal resistor 570. A second signal resistor 568 connects the collector of transistor 550 with voltages 552 and 572.

The servo-motor armature 562 is connected to the upper ends of the signal resistors 568 and 570 respectively and has a series rheostat 564 for adjusting maximum speed. The motor field 560 has its own voltage supply.

In the FIG. 10 circuit, during a condition of too small gap spacing, or short circuit, condenser 520 will be at low potential—lower than reference 542. There will be then zero or positive voltage between base and emitter of transistor 546 and the latter will be non-conductive. Then transistor 550 is also rendered non-conductive.

Electron flow under this condition will be from backup voltage 572 through signal resistor 568, rheostat 564 and armature 562. The armature will rotate in accordance with preselected circuit parameters to retract electrode 510.

The null condition occurs when the voltage stored in condenser 520 is just slightly more positive than preset reference voltage 542. By "slightly more positive," I mean more positive in the order of a tenth or a few tenths of a volt. The transistor circuit as shown is known as a common emitter circuit and is characteristically both a current and voltage amplifier. Thus electron flow is from condenser 520, through limiting resistor 544, through base-emitter of transistor 546, limiting resistor 548 and reference 542, and this flow through the base-emitter junction of transistor 546 is amplified because of the voltage on the collector of transistor 546 derived from the midpoint of resistor 554–556 which shunts downfeed voltage 552. Since 546 has been rendered conductive, electron flow is from voltage 552, through transistor 546 to the base-emitter junction of transistor 550 and back to voltage 552. This renders 550 partially conductive causing electron flow in the loop 552, 568, 550, 543 and 545. At this null or hold condition, the voltage drop across resistor 568 equals backup voltage 572 and no rotation of armature 562 occurs.

The third condition occurs when the voltage on condenser 520 is substantially higher than reference 542, which represents open circuit or at least greater than normal gap spacing. In such instance, the voltage differential may be in the order of one volt or more, thus causing amplifying transistor 546 and output transistor 550 both to become more conductive. This will cause the voltage drop across resistor 568 to increase and exceed that of backup supply 572, whereupon a shunt electron flow from voltage source 552 through resistor 570, armature 562, rheostat 564 and transistor 550, will take place and armature 562 will downfeed.

Figure 11:
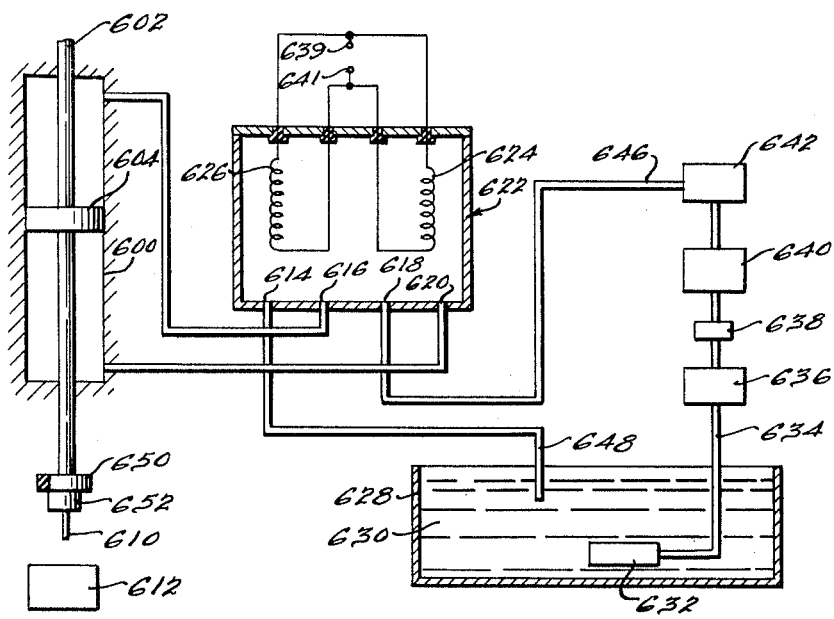
FIG. 11 is a schematic showing of a hydraulic power feed system usable with said machining circuits.

In FIG. 11, I have shown a hydraulically operated power feed means which is operable with the same sensing circuit as shown in FIG. 10 and which may be used with any of the power circuits shown in FIGS. 1–5 inclusive.

In FIG. 11, the terminals 639 and 641 correspond to the connections of the power feed control system to opposite sides of the armature 562 of FIG. 10. The sensing and amplifying circuits described in connection with FIG. 10 may be identical and will not be again described. The electrode 610 (which may weigh a few ounces or several hundred pounds) is held in a collet 652 carried by an insulating plate 650. The latter is, in turn, carried by a piston rod 602 which is attached to piston 604 in cylinder 600. It will be understood that cylinder 600 is rigidly mounted on the column of the machine tool. The hydraulic servo control valve which regulates control of fluid to each end of cylinder 600 is generally designated by numeral 622. This valve may be any one of several obtainable commercially, and one example is more fully described in my Patent No. 2,962,630, mentioned above.

The fluid circuit comprises a reservoir 628 which contains fluid 630. The fluid is drawn through screen 632 through input suction line 634 by a pump 636. The pump, which operates in a range of from 500 to 3000 p.s.i., forces fluid through check valve 638 and filter 640 to an accumulator 642 which stores hydraulic pressure and eliminates surging. Pressure line 646 connects with input port 618 of valve 622. The hydraulic circuit is completed by the valve through the hydraulic cylinder, and any flow of fluid is exhausted by valve exhaust port 614 into line 648.

The valve 622 has a pair of energizable coils 624–626 connected in parallel.

Let is be assumed that the polarity of terminal 639–641 is such that downfeed of electrode 610 is called for. In such instance, coils 624–626 are energized in such polarity that the valve is operated to increase pressure at port 616 and decrease pressure at port 620, whereupon piston 604 will be moved downwardly. When electrode backup is signaled, coils 624–626 are oppositely polarized, and opposite movement of the piston takes place.

I claim:

1. The process of eroding a conductive workpiece by means of electrical discharges across a gap between the workpiece and an electrode which comprises, maintaining a dielectric coolant in the gap, supplying to the gap power pulses of a polarity such that the polarity of the electrode is positive and the polarity of the workpiece is negative, said pulses of a voltage magnitude at a predetermined level in excess of 150 volts, and maintaining sufficient gap spacing between said electrode and workpiece to provide an anodic discharge area on said electrode substantially greater than the cathodic discharge area on said workpiece.

2. The process of eroding a conductive workpiece by means of electrical discharges across a gap between the workpiece and an electrode which comprises, maintaining a dielectric coolant of the hydrocarbon type in the gap, supplying to the gap power pulses of a polarity such that the polarity of the electrode is positive and the polarity of the workpiece is negative, said pulses of a voltage magnitude in excess of 150 volts, and maintaining sufficient gap spacing between said electrode and workpiece to provide an anodic discharge area on said electrode substantially greater than the cathodic discharge area on said workpiece.

3. The process of eroding a conductive workpiece by means of electrical discharges across a gap between the workpiece and an electrode which comprises, maintaining a dielectric coolant in the gap, maintaining the electrode and workpiece at sufficient spacing and supplying across the gap voltage pulses of a polarity such that the polarity of the electrode is positive and the polarity of the workpiece is negative, said pulses of sufficient magnitude to ionize the gap and to provide an anodic discharge area on said electrode substantially in excess of the cathodic discharge area on said workpiece.

4. The process of eroding a conductive workpiece by means of electrical discharges across a gap between the workpiece and an electrode which comprises, maintaining a dielectric coolant in the gap, supplying to the gap a series of machining power pulses of a polarity such that the polarity of the electrode is positive and the polarity of the workpiece is negative, superimposing on each of said machining power pulses a higher voltage magnitude gap ionizing pulse in excess of 150 volts, and maintaining sufficient gap spacing between said electrode and said workpiece to provide an anodic discharge area on said electrode substantially greater than the cathodic discharge area on said workpiece.

5. The process of eroding a conductive workpiece by means of electrical discharges across a gap between the workpiece and an electrode which comprises, maintaining a dielectric coolant in the gap, simultaneously applying to the gap a machining power pulse and a higher voltage gap ionizing pulse, said pulses of a polarity such that the polarity of the electrode is positive and the polarity of the workpiece is negative, said last mentioned pulse being of a magnitude in excess of 150 volts, and maintaining sufficient gap spacing between said electrode and workpiece to provide an anodic discharge area on said electrode substantially greater than the cathodic discharge area on said workpiece.

6. The process of eroding a conductive workpiece by means of electrical discharges across a gap between the workpiece and an electrode which comprises, maintaining a dielectric coolant in the gap, supplying to the gap a series of machining power pulses of a polarity such that the polarity of the electrode is positive and the polarity of the workpiece is negative, deriving from each of said pulses a higher voltage gap ionizing pulse in excess of 150 volts and delivering it simultaneously with the machining pulse to the gap, and maintaining sufficient gap spacing between said electrode and workpiece to provide an anodic discharge area on said electrode substantially greater than the cathodic discharge area on said workpiece.

7. The process of eroding a conductive workpiece by means of electrical discharges across a gap between the workpiece and an electrode which comprises, maintaining a dielectric coolant in the gap, supplying to the gap a series of machining power pulses of a polarity such that the polarity of the electrode is positive and the polarity of the workpiece is negative, deriving from each of said pulses a higher voltage gap ionizing pulse in excess of 150 volts and delivering it simultaneously with the machining pulse to the gap, sensing gap voltage, and maintaining with reference to the gap voltage sensed a sufficient gap spacing between said electrode and workpiece to provide an anodic discharge area on said electrode substantially greater than the cathodic discharge area on said workpiece.

References Cited in the file of this patent
UNITED STATES PATENTS

| | | |
|---|---|---|
| 2,235,385 | Rava | Mar. 18, 1941 |
| 2,697,160 | Williams | Dec. 14, 1954 |
| 2,759,088 | Lincoln | Aug. 14, 1956 |
| 2,876,386 | Fefer et al. | Mar. 3, 1959 |
| 2,951,142 | Ullmann | Aug. 30, 1960 |
| 3,052,817 | Branker | Sept. 4, 1962 |